(12) United States Patent
Wu

(10) Patent No.: US 11,872,468 B2
(45) Date of Patent: Jan. 16, 2024

(54) SPORT TRAINING METHOD AND SYSTEM AND HEAD-MOUNTED VR DEVICE

(71) Applicant: Qingdao Pico Technology Co., Ltd., Qingdao (CN)

(72) Inventor: Tao Wu, Qingdao (CN)

(73) Assignee: QINGDAO PICO TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 17/883,057

(22) Filed: Aug. 8, 2022

(65) Prior Publication Data

US 2023/0001283 A1    Jan. 5, 2023

Related U.S. Application Data

(63) Continuation of application No. PCT/CN2022/085321, filed on Apr. 6, 2021.

(30) Foreign Application Priority Data

Apr. 9, 2021    (CN) .......................... 202110383654.7

(51) Int. Cl.
| | | |
|---|---|---|
| A63B 71/06 | (2006.01) | |
| G06T 19/00 | (2011.01) | |
| G06F 3/01 | (2006.01) | |

(52) U.S. Cl.
CPC .......... *A63B 71/0622* (2013.01); *G06F 3/011* (2013.01); *G06T 19/006* (2013.01);
(Continued)

(58) Field of Classification Search
CPC ........ A63B 71/0622; A63B 2071/0636; A63B 2071/0638; G06F 3/011; G06F 3/012; G06F 3/014; G06F 3/017; G06T 19/006
See application file for complete search history.

(56) References Cited

U.S. PATENT DOCUMENTS 8,503,086 B2 * 8/2013 French .................... G06F 3/011
                                                            73/379.04
10,136,840 B2 * 11/2018 Guerrero .............. A61B 5/4866
(Continued)

FOREIGN PATENT DOCUMENTS

| CN | 101910992 A | 12/2010 |
|---|---|---|
| CN | 102243687 A | 11/2011 |

(Continued)

OTHER PUBLICATIONS

Chinese Supplementary Search Report for application No. 202110383654.7, dated Apr. 9, 2021.
(Continued)

*Primary Examiner* — Motilewa Good-Johnson
(74) *Attorney, Agent, or Firm* — MOSER TABOADA

(57) ABSTRACT

A sport training method and system and a head-mounted VR device are disclosed. The method is performed by a head-mounted VR device. The head-mounted VR device is wirelessly connected to a hand-motion tracker and a foot-motion tracker. The method comprises: displaying a virtual demonstrative action; acquiring 6DOF head-motion data, 6DOF hand-motion data and 6DOF foot-motion data of the user; fusing the 6DOF hand-motion data and the 6DOF foot-motion data with the 6DOF head-motion data; calculating motion data of different parts of a human body according to the data that have been fused; and comparing the motion data of the different parts of the human body obtained by the calculation with standard sport training data of the virtual demonstrative action, and if a degree of similarity is greater than a threshold, determining that an action of a human-body part meets a training standard, and if not, displaying a corresponding prompting message in a virtual reality scene to prompt a human-body part whose action is not standard.

6 Claims, 4 Drawing Sheets

(52) U.S. Cl.
CPC ............... *A63B 2071/0636* (2013.01); *A63B 2071/0638* (2013.01)

(56) References Cited

U.S. PATENT DOCUMENTS

| | | | |
|---|---|---|---|
| 10,416,755 B1* | 9/2019 | Erivantcev | G06V 10/82 |
| 10,529,137 B1* | 1/2020 | Black | G06V 10/255 |
| 10,642,344 B2* | 5/2020 | Kobayashi | G06F 3/0346 |
| 10,705,597 B1* | 7/2020 | Morin | G02B 27/0179 |
| 11,017,560 B1* | 5/2021 | Gafni | G06N 3/045 |
| 11,045,114 B2* | 6/2021 | Guerrero | G16Z 99/00 |
| 11,145,133 B2* | 10/2021 | Kopeinigg | G06N 20/00 |
| 11,164,321 B2* | 11/2021 | Hsu | G06T 17/00 |
| 11,182,946 B2* | 11/2021 | Garofalo | G06F 3/017 |
| 11,213,733 B1* | 1/2022 | Morin | G06F 3/011 |
| 11,221,493 B1* | 1/2022 | Baker | G06F 3/017 |
| 11,564,597 B2* | 1/2023 | Guerrero | A61B 5/002 |
| 2012/0183939 A1* | 7/2012 | Aragones | A63B 24/0062 434/247 |
| 2012/0218262 A1* | 8/2012 | Yomdin | G06T 13/40 345/473 |
| 2013/0190903 A1* | 7/2013 | Balakrishnan | A63B 71/06 700/91 |
| 2013/0271458 A1* | 10/2013 | Andriluka | G06V 40/23 345/619 |
| 2013/0317634 A1* | 11/2013 | French | A63F 13/213 700/91 |
| 2016/0202755 A1* | 7/2016 | Connor | G06F 3/011 73/865.4 |
| 2017/0039881 A1* | 2/2017 | Belch | H04N 5/2628 |
| 2018/0059777 A1 | 3/2018 | Kobayashi et al. | |
| 2019/0362557 A1* | 11/2019 | Lacey | G06F 3/017 |
| 2021/0081031 A1* | 3/2021 | Perlin | G06F 3/04817 |
| 2021/0132684 A1* | 5/2021 | Lin | G06F 3/011 |
| 2022/0206566 A1* | 6/2022 | Senkal | G06N 3/044 |
| 2022/0253126 A1* | 8/2022 | Holland | G06F 3/011 |
| 2022/0308342 A1* | 9/2022 | Gullicksen | G01S 11/026 |
| 2023/0001283 A1* | 1/2023 | Wu | G06F 3/014 |

FOREIGN PATENT DOCUMENTS

| | | |
|---|---|---|
| CN | 202662011 U | 1/2013 |
| CN | 103100205 A | 5/2013 |
| CN | 105396279 A | 3/2016 |
| CN | 106422207 A | 2/2017 |
| CN | 107281728 A | 10/2017 |
| CN | 107349573 A | 11/2017 |
| CN | 107376302 A | 11/2017 |
| CN | 107930013 A | 4/2018 |
| CN | 108091380 A | 5/2018 |
| CN | 108187333 A | 6/2018 |
| CN | 108786015 A | 11/2018 |
| CN | 109260647 A | 1/2019 |
| CN | 109350923 A | 2/2019 |
| CN | 109528203 A | 3/2019 |
| CN | 109643159 A | 4/2019 |
| CN | 110227249 A | 9/2019 |
| CN | 110624217 A | 12/2019 |
| CN | 111135536 A | 5/2020 |
| CN | 111330214 A | 6/2020 |
| CN | 111803903 A | 10/2020 |
| CN | 112527102 A | 3/2021 |
| CN | 113181619 A | 7/2021 |
| KR | 101763404 B1 | 7/2017 |

OTHER PUBLICATIONS

Chinese First Office Action for application No. 202110383654.7, dated Nov. 23, 2021.
International Search Report for application No. PCT/CN2022/085321, dated Jul. 7, 2022.

* cited by examiner

SPORT TRAINING METHOD AND SYSTEM AND HEAD-MOUNTED VR DEVICE

CROSS-REFERENCE TO RELATED APPLICATIONS

This application is entered as a bypass continuation application under 35 U.S.C. § 111(a) of International Application No. PCT/CN2022/085321, filed on Apr. 6, 2022, which claims priority to Chinese Patent Application No. 202110383654.7, filed on Apr. 9, 2021. The embodiment of the priority applications are hereby incorporated herein in their entirety by reference.

TECHNICAL FIELD

The present application relates to the field of VR, in particular to a sport training method and system and a head-mounted VR device.

BACKGROUND

With the advancement of society, people pay more and more attention to health. In the prior art, fitness activities (such as yoga) are usually carried out in a yoga club or gym. The participants are required to pay a certain fee, and a yoga instructor carries out on-site teaching and instructing. When there are a large number of participants, the yoga instructor cannot take care of every participant and instruct them individually. On the other hand, if the class size is small, the costs of the participants and the yoga club will be increased. Thus, the traditional ways of fitness have many problems, such as a low intelligence degree, a low efficiency, a high cost, and a poor fitness effect.

In the prior art, users may also choose to practice at home by downloading some videos of training subjects and learning and practicing on the computer or TV. However, this video-instruction method is only a one-way instruction, and users cannot obtain the feedback on whether their own actions are correct or accurate, cannot determine whether their yoga actions are standard, cannot correct their own actions in time, and cannot evaluate the fitness effect, which results in a low efficiency and a poor fitness effect.

SUMMARY

In view of the problems in the conventional fitness methods, such as low efficiency and effect, and the lack of systematic fitness evaluation and feedback mechanism, the present application is proposed to provide a sport training method, device and system to overcome the above problems or at least partially solve the above problems.

According to an aspect of the present application, there is provided a sport training method. The sport training method is performed by a head-mounted VR device. The head-mounted VR device is wirelessly connected to a hand-motion tracker and a foot-motion tracker. The hand-motion tracker is used to track motion data of a hand of a user, and the foot-motion tracker is used to track motion data of a foot of the user. The method comprises:
  displaying a virtual demonstrative action;
  acquiring 6DOF head-motion data, 6DOF hand-motion data and 6DOF foot-motion data of the user;
  fusing the 6DOF hand-motion data and the 6DOF foot-motion data with the 6DOF head-motion data;
  calculating motion data of different parts of a human body according to the data that have been fused; and
  comparing the motion data of the different parts of the human body obtained by the calculation with standard sport training data of the virtual demonstrative action, and if a degree of similarity is greater than a threshold, determining that an action of a human-body part meets a training standard, and if not, displaying a corresponding prompting message in a virtual reality scene to prompt a human-body part whose action is not standard.

According to another aspect of the present application, a head-mounted VR device is provided. The head-mounted VR device is wirelessly connected to a hand-motion tracker and a foot-motion tracker. The hand-motion tracker is used to track motion data of a hand of a user, and the foot-motion tracker is used to track motion data of a foot of the user. The head-mounted VR device comprises:
  a displaying unit configured for displaying a virtual demonstrative action;
  an acquiring unit configured for acquiring 6DOF head-motion data, 6DOF hand-motion data and 6DOF foot-motion data of the user;
  a fusing unit configured for fusing the 6DOF hand-motion data and the 6DOF foot-motion data with the 6DOF head-motion data;
  a calculating unit configured for calculating motion data of different parts of a human body according to the data that have been fused; and
  a comparing unit configured for comparing the motion data of the different parts of the human body obtained by the calculation with standard sport training data of the virtual demonstrative action, and if a degree of similarity is greater than a threshold, determining that an action of a human-body part meets a training standard, and if not, displaying a corresponding prompting message in a virtual reality scene to prompt a human-body part whose action is not standard.

According to yet another aspect of the present application, there is provided a sport training system, which comprises: a server, and a plurality of head-mounted VR devices connected to the server via a network;
  each of the head-mounted VR devices is configured for sending motion data of different parts of a human body obtained by calculation to the server;
  the server is configured for receiving the motion data of the different parts of the human body sent by the plurality of head-mounted VR devices; in a virtual reality scene, according to the motion data, drawing a plurality of user avatars, and according to the plurality of user avatars, rendering to generate a multi-person interactive motion scene; and sending the multi-person interactive motion scene to each of the head-mounted VR devices in real time; and each of the head-mounted VR devices is further configured for displaying the multi-person interactive motion scene on a display screen, so as to realize remote interaction with another sport training user in the virtual reality scene.

According to still another aspect of the present application, there is provided a computer-readable storage medium having one or more programs stored therein, wherein when executed by a processor, the one or more programs implement the above-described sport training method.

By using the above technical solutions, the present application can achieve the following advantageous effects.

By wearing the hand-motion tracker and the foot-motion tracker respectively at the specified parts of a hand and a foot of the user, and wearing the head-mounted VR device on the head of the user, the motion information of the key limbs of each of the sport training users can be tracked in real time, and the user is not required to wear a large number of sensors, which is very convenient for the user to wear. The head-mounted VR device acquires the 6DOF head-motion data collected in real time by itself, the 6DOF hand-motion data collected in real time by the hand-motion tracker and the 6DOF foot-motion data collected in real time by the foot-motion tracker, and fuses the 6DOF hand-motion data and the 6DOF foot-motion data with the 6DOF head-motion data to acquire high-precision high-frequency motion data, thereby increasing the tracking precision. The motion data of different parts of the human body are calculated according to the data that have been fused, the motion data of the different parts of the human body obtained by the calculation are compared with the standard sport training data, and if the degree of similarity is greater than a threshold, it is determined that the action of the human-body part meets the training standard, and if not, the prompting message is marked on the human-body part whose action is not standard in the head-mounted VR device for action standardizing correction. In this way, when the users are exercising at home, they can still judge whether the actions are standard or not, and correct non-demonstrative actions in time, thereby improving the fitness efficiency and effect, and solving the problems in the process of yoga and other fitness activities, such as the inability to determine whether the actions are standard or not, the inability to correct the actions in time, and the lack of systematic fitness evaluation and feedback mechanism. Moreover, the remote interaction among sport training users can be realized by using the server, which further improves the user experience.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

By reading the following detailed description of the preferable embodiments, various other advantages and benefits will become clear to a person skilled in the art. The drawings are merely intended to show the preferable embodiments, and are not to be considered as limiting the present application. Furthermore, throughout the drawings, the same reference signs denote the same elements. In the drawings.

DETAILED DESCRIPTION

The exemplary embodiments of the present application will be described in further detail below with reference to the drawings. Although the drawings illustrate the exemplary embodiments of the present application, it should be understood that the present application may be implemented in various forms, which should not be limited by the embodiments illustrated herein. In contrast, the purpose of providing those embodiments is to more clearly understand the present application, and to completely convey the scope of the present application to a person skilled in the art.

The virtual reality (VR) technique provides people a sense of environmental immersion by simulating a virtual environment by using a computer. In the present application, the problems in the process of yoga and other fitness activities, such as the inability to determine whether the actions are standard, the inability to correct the actions in time, and the lack of systematic fitness evaluation and feedback mechanism, are solved by combining the VR device with sensors, thereby bringing the user a better fitness experience. In the technical solutions of the present application, before performing the sport training the user wears a hand-motion tracker and a foot-motion tracker respectively at specified parts of the hand and the foot, and wears a head-mounted VR device on the head. The hand-motion tracker and the foot-motion tracker are wirelessly connected to the head-mounted VR device. During the sport training, the user makes corresponding actions according to the virtual demonstrative actions displayed in the head-mounted VR device.

Figure 1:
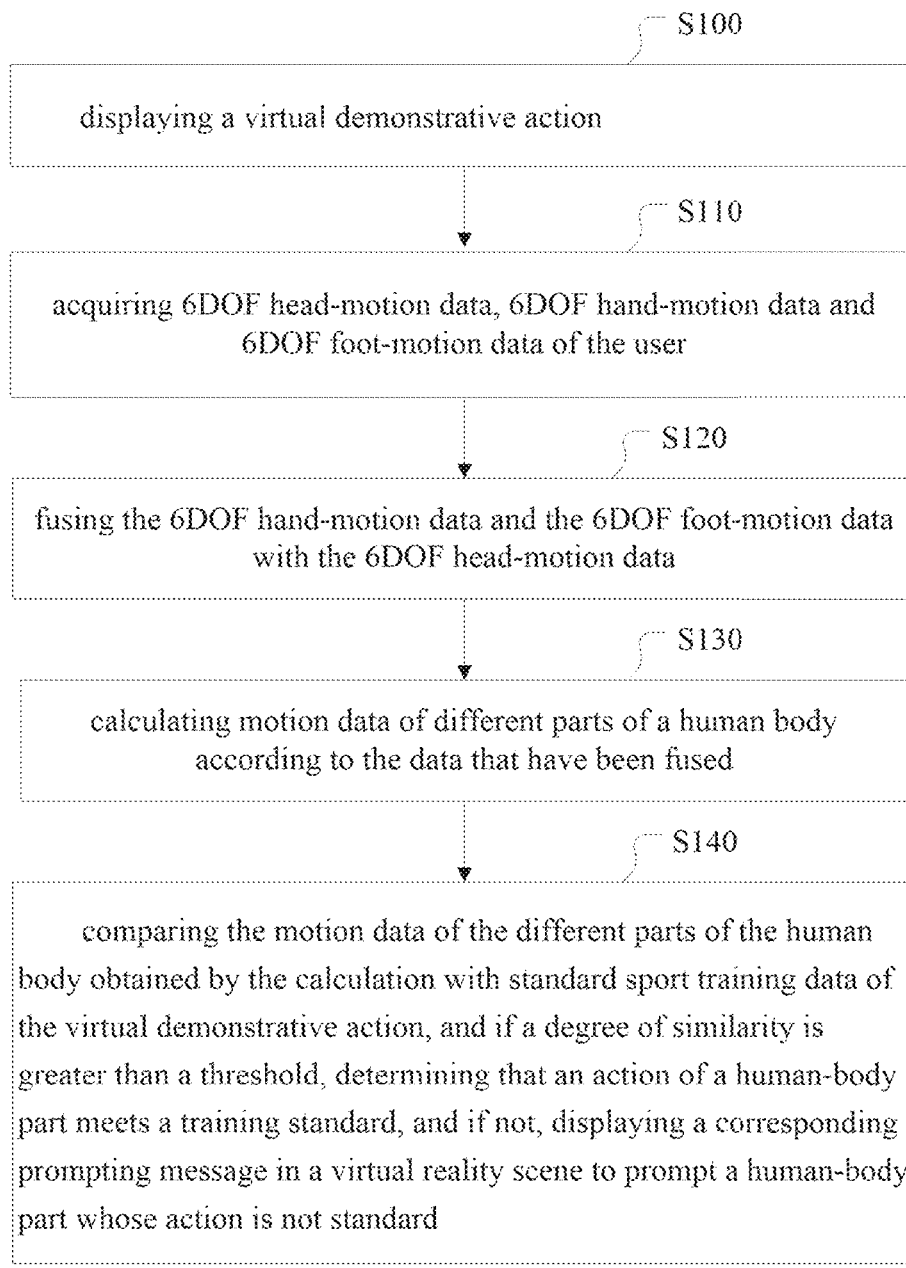
FIG. 1 is a schematic flow chart of a sport training method according to an embodiment of the present application.

FIG. 1 is a schematic flow chart of the sport training method according to an embodiment of the present application. As shown in FIG. 1, the method is performed by a head-mounted VR device, and comprises:

Step S100: displaying a virtual demonstrative action.

Step S110: acquiring 6DOF head-motion data, 6DOF hand-motion data and 6DOF foot-motion data of the user.

6-DOF refers to that the information of 6 degrees of freedom (DOF) is used to represent the motion of an object, including the displacement information on X, Y and Z axes and the rotation information on the X, Y and Z axes. In the present embodiment, not only the change of the visual field angle caused by the rotation of the parts of the body can be detected, but also the change of up, down, front, back, left and right displacements caused by the movement of the parts of the body can be detected.

In the present embodiment, the 6-DOF motion data of the head, the hand and the foot of the user are collected in real time to comprehensively monitor the motion data of the joints of the human body, which can more truly and accurately reflect the motion of the human body.

Step S120: fusing the 6DOF hand-motion data and the 6DOF foot-motion data with the 6DOF head-motion data.

In the present embodiment, the 6-DOF motion data of the head, the hand and the foot are acquired by using the head-mounted VR device, the hand-motion tracker and the foot-motion tracker respectively; in other words, each of the 6-DOF motion data has its own coordinate system. Therefore, it is necessary to fuse the motion data of the head, the hand and the foot, and particularly, to unify the 6-DOF motion data of the hand and the foot into the coordinate system of the head, so as to make the motion of the real human body consistent with the motion of the virtual human body in the head-mounted VR device.

Step S130: calculating motion data of different parts of a human body according to the data that have been fused.

In the present embodiment, the motion data of the head, the hand and the foot are fused, the 6-DOF motion data of the hand and the foot are unified into the coordinate system of the head, and the motion data of the 6-DOF motion data of the head, the hand and the foot in the head coordinate system are calculated.

Step S140: comparing the motion data of the different parts of the human body obtained by the calculation with standard sport training data of the virtual demonstrative action, and if a degree of similarity is greater than a threshold, determining that an action of a human-body part meets a training standard, and if not, displaying a corresponding prompting message in a virtual reality scene to prompt a human-body part whose action is not standard.

In the present embodiment, the standard sport training data are a standard action database established by collecting the data of the corresponding actions completed by senior sport trainers according to the above steps. For example, the threshold may be set to 95%.

In sum, in the technical solution of the present embodiment, by wearing the hand-motion tracker and the foot-motion tracker respectively at the specified parts of a hand and a foot of the user, and wearing the head-mounted VR device on the head of the user, the motion information of the key limbs of each of the sport training users can be tracked in real time, and the user is not required to wear a large number of sensors, which is very convenient for the user to wear. The head-mounted VR device acquires the 6DOF head-motion data collected in real time by itself, the 6DOF hand-motion data collected in real time by the hand-motion tracker and the 6DOF foot-motion data collected in real time by the foot-motion tracker, and fuses the 6DOF hand-motion data and the 6DOF foot-motion data with the 6DOF head-motion data to acquire high-precision high-frequency motion data, thereby increasing the tracking precision. The motion data of different parts of the human body are calculated according to the data that have been fused, the motion data of the different parts of the human body obtained by the calculation are compared with the standard sport training data, and if the degree of similarity is greater than a threshold, it is determined that the action of the human-body part meets the training standard, and if not, the prompting message is marked on the human-body part whose action is not standard in the head-mounted VR device for action standardizing correction. In this way, when the users are exercising at home, they can still judge whether the actions are standard or not, and correct non-demonstrative actions in time, thereby improving the fitness efficiency and effect, and solving the problems in the process of yoga and other fitness activities, such as the inability to determine whether the actions are standard or not, the inability to correct the actions in time, and the lack of systematic fitness evaluation and feedback mechanism.

In an embodiment of the present application, the head-mounted VR device is provided therein with a head-mounted tracking camera, an electromagnetic signal receiving module or an ultrasonic signal receiving module. The hand-motion tracker and the foot-motion tracker are both provided therein with an electromagnetic sensor and an electromagnetic signal emitting module, or both provided therein with an ultrasonic sensor and an ultrasonic signal emitting module.

The head-mounted VR device acquires the 6DOF head-motion data collected in real time, the 6DOF hand-motion data collected in real time by the hand-motion tracker, and the 6DOF foot-motion data collected in real time by the foot-motion tracker, which further comprises:

the head-mounted VR device collects the pose information of the head motion in real time by using the built-in head-mounted tracking camera;

the hand-motion tracker and the foot-motion tracker collect the pose information of the hand motion and the pose information of the foot motion in real time respectively by using the built-in electromagnetic sensor, and wirelessly transmit them to the electromagnetic signal receiving module of the head-mounted VR device by using the electromagnetic signal emitting module; or, the hand-motion tracker and the foot-motion tracker collect the pose information of the hand motion and the pose information of the foot motion in real time respectively by using the built-in ultrasonic sensor, and wirelessly transmit them to the ultrasonic signal receiving module of the head-mounted VR device by using the ultrasonic signal emitting module.

In the present embodiment, preferably, the head-mounted VR device is provided with built-in high-performance central processing unit (CPU) and graphics processing unit (GPU), which may be a high-performance mobile platform such as Qualcomm snapdragon 845 and Qualcomm snapdragon 865. The head-mounted VR device is further provided therein with 4 head-mounted tracking cameras, and each of the head-mounted tracking cameras is configured as follows: (1) frame rate: 30 Hz or higher; (2) angle of view (FOV): 130° *80° (H*V) or higher; (3) exposure mode: generally global shutter; and (4) light transmission band of lens: generally about 400-900. The head-mounted VR device collects the 6-DOF pose information of the user's head motion relative to the environment in real time by using the head-mounted tracking cameras.

In an embodiment of the present application, the head-mounted VR device is further provided therein with a first wireless-communication module and a first IMU sensor, and the hand-motion tracker and the foot-motion tracker are both further provided therein with a second wireless-communication module and a second IMU sensor.

The head-mounted VR device acquires the 6DOF head-motion data collected in real time, the 6DOF hand-motion data collected in real time by the hand-motion tracker, and the 6DOF foot-motion data collected in real time by the foot-motion tracker, which further comprises:

the head-mounted VR device further collects the IMU information of the head motion in real time by using the built-in first IMU sensor, and fuses the IMU information of the head motion with the pose information of the head motion to obtain the 6DOF head-motion data;

the hand-motion tracker and the foot-motion tracker further collect the IMU information of the hand motion and the IMU information of the foot motion in real time respectively by using the built-in second IMU sensor, and wirelessly transmit them to the first wireless-communication module of the head-mounted VR device by using the second wireless-communication module; and the head-mounted VR device fuses the pose information of the hand motion with the IMU information of the hand motion to obtain the 6DOF hand-motion data, and fuses the pose information of the foot motion with the IMU information of the foot motion to obtain the 6DOF foot-motion data.

In addition to the 4 built-in head-mounted tracking cameras, in order to output the 6-DOF motion data with a high frequency (>200 Hz), the head-mounted VR device generally requires to be provided with a built-in high-precision high-frequency IMU (Inertial Measurement Unit) inertial navigation sensor to measure the three-axis attitude angle (or angular velocity) and the acceleration of the head. High-frequency 6-DOF information of the motion state of the head-mounted VR device can be output by using the technique of simultaneous localization and mapping (SLAM) in combination with the IMU information.

The hand-motion tracker can realize the hand motion tracking by using an electromagnetic sensor or an ultrasonic sensor. If an electromagnetic sensor is used, an electromagnetic signal emitting module is provided in the hand-motion tracker, and an electromagnetic signal receiving module is provided in the head-mounted VR device. If an ultrasonic sensor is used, an ultrasonic signal emitting module is provided in the hand-motion tracker, and an ultrasonic signal receiving module is provided in the head-mounted VR device. The hand-motion tracker is further provided therein with a wireless-communication module. In order to improve the tracking stability of the hand-motion tracker, it is further provided therein with an IMU sensor with a high precision and a high frequency to transmit the IMU inertial-navigation information in the hand-motion tracker to the head-mounted VR device by using the wireless-communication module. The electromagnetic signal receiving module or the ultrasonic signal receiving module at the head-mounted VR device receives the motion electromagnetic signal or the motion ultrasonic signal of the hand-motion tracker, combined with the IMU information of the hand motion tracking, the 6-DOF information of the hand-motion tracker is calculated in real time by using an electromagnetic-signal processing algorithm or an ultrasonic-signal processing algorithm. The built-in motion sensor of the foot-motion tracker is the same as that of the hand. If the hand-motion tracker is provided therein with an electromagnetic-wave sensor, the foot-motion tracker is also provided therein with an electromagnetic-wave sensor. If the hand-motion tracker is provided therein with an ultrasonic sensor, the foot-motion tracker is also provided therein with an ultrasonic sensor.

In the present embodiment, the hand-motion tracker and the foot-motion tracker respectively acquire the 6DOF hand-motion data and the 6DOF foot-motion data by using the built-in electromagnetic sensor or ultrasonic sensor in combination with the second IMU sensor, and the head-mounted VR device acquires the 6DOF head-motion data by using the head-mounted tracking camera and the first IMU sensor, thereby overcoming the defects in the prior art that the acquirement of the user motion data by using the IMU sensor can only acquire the 3-DOF attitude data of the human joint points and cannot acquire the displacement data of the joint points, and that the IMU sensor will have a cumulative drift error over time. Thus, it acquires high-precision high-frequency 6-DOF motion data and increases the tracking precision, so that the position offset error can reach the order of millimeters, the rotation angle offset error can be controlled within 1.5°, and the outputted frequency is greater than 200 Hz.

In an embodiment of the present application, the head-mounted VR device fuses the 6DOF hand-motion data and the 6DOF foot-motion data with the 6DOF head-motion data, which comprises:

the head-mounted VR device acquires a rotation matrix and a translation vector of the electromagnetic signal receiving module or ultrasonic signal receiving module relative to the first IMU sensor, performs coordinate system conversion on the 6DOF hand-motion data and 6DOF foot-motion data by using the rotation matrix and the translation vector, and converts them into 6-DOF motion data with the first IMU sensor as the origin.

In the present embodiment, the hand-motion tracker and the foot-motion tracker are provided therein with the electromagnetic sensor or the ultrasonic sensor, and the VR head-mounted displaying all-in-one machine is provided therein with the electromagnetic signal receiving module or the ultrasonic signal receiving module. The coordinate systems of the 6-DOF motion data of the hand and the foot use the receiving-end sensors as the origin, while the coordinate system of the 6-DOF motion data of the head uses the first IMU sensor as the origin. Only by unifying the 6-DOF motion data of the hand, the foot and the head into the same coordinate system can the motion of the real human body be consistent with that of the virtual human body in the head-mounted VR device.

Particularly, the 6-DOF motion data of the hand and the foot are unified into the head coordinate system, which comprises: acquiring respectively a rotation matrix R and a translation vector T of the electromagnetic signal receiving module or the ultrasonic signal receiving module in the head-mounted VR device relative to the first IMU sensor, performing coordinate system conversion on the 6-DOF motion data of the hand and the foot by using the rotation matrix R and the translation vector T, and converting them into 6-DOF tracking data with the first IMU sensor built in the head-mounted VR device as the origin. The formulas of the coordinate system conversion are:

$$\text{6-DOF motion data with the first IMU sensor as the origin} = R * \text{6DOF hand-motion data} + T \quad (1)$$

$$\text{6-DOF motion data with the first IMU sensor as the origin} = R * \text{6DOF foot-motion data} + T \quad (2)$$

In order to accurately calculate the motion data of the different parts of the human body, in an embodiment of the present application, before sport training, the human-body motion data are calibrated according to the actions made by the user corresponding to the demonstrative actions. Particularly, when the user wears the hand-motion tracker, the foot-motion tracker and the head-mounted VR device, and makes corresponding actions according to the virtual calibration actions displayed in the head-mounted VR device, the motion speed and the motion angle of the different parts of the human body, the displacement information of each part, and the motion hold time of each key part of the human body are calculated according to the data that have been fused and the sport training calibration data by using an inverse kinematics algorithm.

Taking yoga as an example, the operation of the system according to the present application is described below.

(1) Before the exercise, the user firstly, according to a yoga training instruction manual, wears the motion tracking sensors on the specified parts of the hand and the foot and then wears the head-mounted VR device.

(2) After the user has worn the sensors, the calibration of the human-body motion data is performed firstly in a "yoga training instruction" APP in the head-mounted VR device. The user, according to the demonstrative actions indicated by the APP, makes several corresponding actions, to perform the calibration of the human-body motion data, so as to make the motion tracking data of each sensor for the user's yoga actions more stable and precise. The human-body motion calibration data will be stored in the head-mounted VR device accordingly. The whole calibration process spends about 1-2 minutes. In order to make the motion tracking data of the yoga actions more stable and precise, it is recommended to calibrate the human-body motion data every time after wearing the motion tracking sensors.

(3) After the above steps (1) and (2) have been completed, yoga training instruction may be provided. The user may select different yoga exercise actions in the APP. After selecting the yoga exercise actions, the user can see the virtual demonstrative action of each of the actions in the head-mounted VR device, and then the user makes the corresponding actions simultaneously. The system will calculate the motion speed and the motion angle of the different parts of the human body, the displacement information of each part, and the motion hold time of each key part of the human body according to the 6DOF head-motion data, the 6DOF hand-motion data, the 6DOF foot-motion data and the human-body motion calibration data at this moment in combination with the IK (inverse kinematics) algorithm, and compare them with the yoga training database in the head-mounted VR device. If the degree of similarity is greater than 95%, it is considered that the action of the human-body part meets the yoga training standard, and if not, the human-body part whose action is not standard is marked with a prompting message in the head-mounted VR device for action standardizing correction.

(4) According to step (3), the actions in exercise courses are made in turn. The duration of each exercise course is about 30-40 minutes. After each exercise course has ended, the APP will count the quantity of wrong actions, the occurrence time of wrong actions, the average success rate of correct actions, and the quantity of actions completed in this course.

In an embodiment of the present application, the head-mounted VR device further sends the motion data of the different parts of the human body obtained by the calculation to a server, and receives the multi-person interactive motion scene rendered and updated by the server by using a graphics processing unit (GPU), so as to realize remote interaction with another sport training user in the virtual reality scene.

Figure 2:
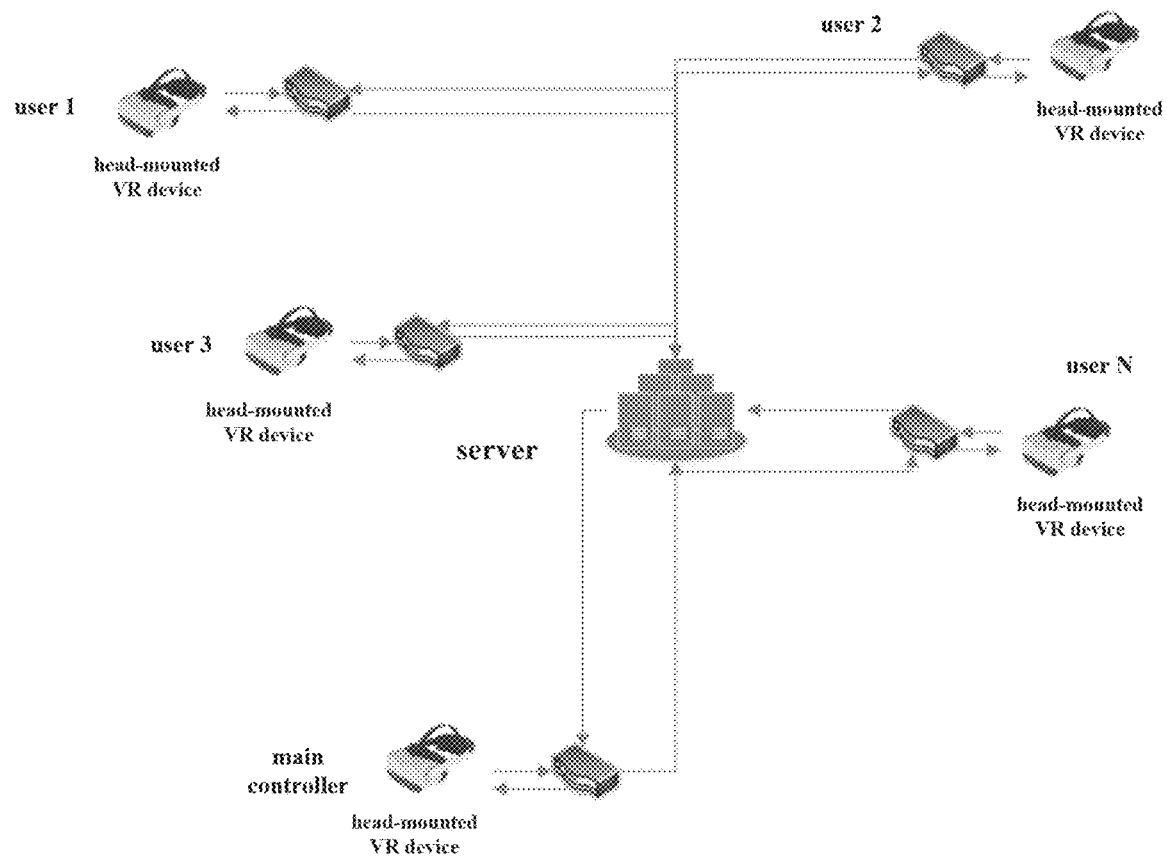
FIG. 2 is a schematic diagram of multi-user VR remote interaction according to an embodiment of the present application.

As shown in FIG. 2, the present embodiment requires to construct a server. The user may determine the processing capacity, the application scene rendering capacity and other hardware configuration specifications of the server according to the quantity of the clients in the actual application (i.e. the head-mounted VR devices shown in FIG. 2) and the rendering complexity of the VR content. In the present embodiment, the maximum quantity of the clients that the server can support is 100.

In the present embodiment, the head-mounted VR device is provided therein with components such as a CPU, a GPU, and a wireless network module, collects the 6DOF head-motion data in real time, acquires the 6DOF hand-motion data collected in real time by the hand-motion tracker and the 6DOF foot-motion data collected in real time by the foot-motion tracker, fuses the 6DOF hand-motion data and the 6DOF foot-motion data with the 6DOF head-motion data, and calculates the motion data of different parts of the human body according to the data that have been fused, to obtain 150 Hz of the motion data of the different parts of the human body. Each of the clients is connected to a network via a wireless network processor such as a wireless router, and then is connected to the server via the network.

The server receives the 150 Hz of the motion data of the different parts of the human body sent by each of the head-mounted VR devices via the network in real time, fuses the received motion data again, draws user avatars in the virtual reality scene, drives the virtual user avatars in real time by using the GPU for the user data of each of the head-mounted VR devices, renders and updates the information content of the multi-person interactive scene, and then transmits it to the head-mounted VR device of each of the clients in real time. Other sport training users may observe the motion states of the other sport training users in the multi-person interactive motion scene in real time on their own display screens from a third-party's perspective.

The present embodiment further constructs a main controller. The main controller serves as the administrator in the sport training system and is configured to manage the head-mounted VR devices in the system. In the present embodiment, the physical structure of the main controller is the same as the physical structure of the head-mounted VR devices.

Taking yoga as an example, the operation of the user interaction system according to the present application is described below.

(1) Before the exercise, the user sends a "request for joining multi-person fitness interaction" to the server in the multi-person fitness APP of the head-mounted VR device.

(2) The server quickly sends the instruction of "request for joining multi-person fitness interaction" sent by the user to the main controller.

(3) The main controller confirms the user's joining request. If the user is allowed to join, the main controller sends a consent instruction to enable the user to join the multi-person fitness system.

In the present embodiment, the main controller may be any senior fitness expert user who is responsible for inviting other fitness enthusiastic users to join the multi-person fitness system, and is also responsible for taking normative measures such as establishing fitness rules and punishment and reward mechanisms.

In the process of the sport training, any sport training user may chat with the other sport training users by using a microphone on the head-mounted VR device, and may share the technical methods of fitness sports. Some senior fitness experts may help some junior sport training users correct their technical actions of fitness, and may share some interesting and active interactive topics conducive to fitness, such as diet precautions of fitness sports, to realize the remote interaction among the sport training users and improve the user experience.

Figure 3:
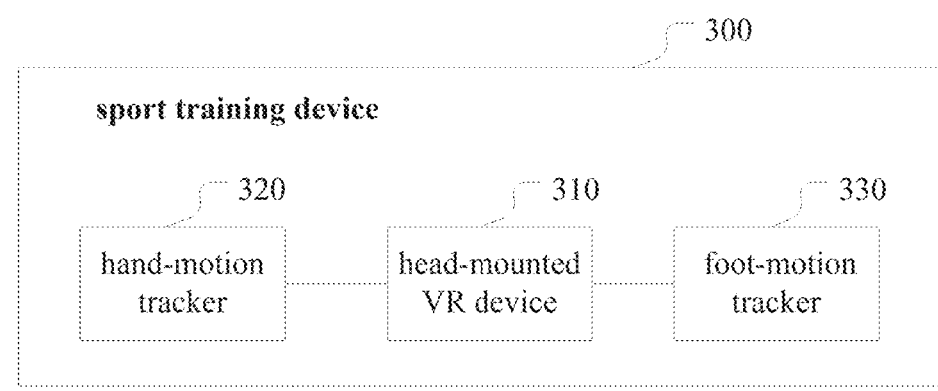
FIG. 3 is a schematic structural diagram of a sport training device according to an embodiment of the present application.
Figure 4:
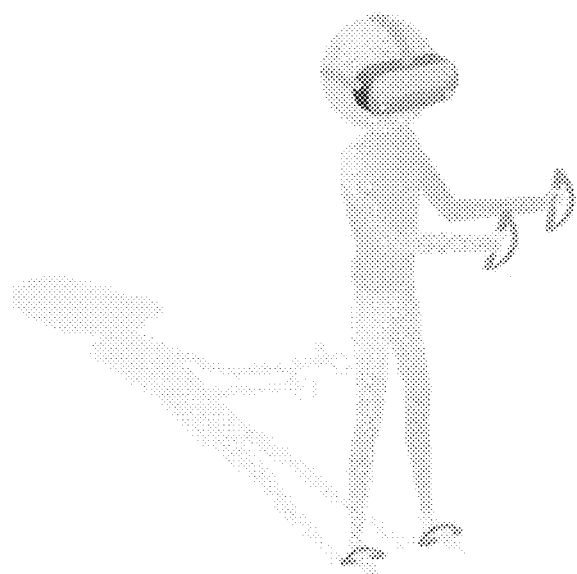
FIG. 4 is a schematic diagram of a wearing effect according to an embodiment of the present application.

FIG. 3 is a schematic structural diagram of a sport training device according to an embodiment of the present application. As shown in FIG. 3, the sport training device 300 comprises: a head-mounted VR device 310, a hand-motion tracker 320 and a foot-motion tracker 330. The hand-motion tracker 320 and the foot-motion tracker 330 are wirelessly connected to the head-mounted VR device 310. Before sport training, the hand-motion tracker 320 and the foot-motion tracker 330 are respectively worn on the specified parts of a hand and a foot of the user, and the head-mounted VR device 310 is worn on the head of the user. The wearing effect is shown in FIG. 4. During the sport training, the user makes corresponding actions according to the virtual demonstrative actions displayed in the head-mounted VR device 310.

The hand-motion tracker 320 is used to collect 6DOF hand-motion data in real time and wirelessly transmit it to the head-mounted VR device 310.

The foot-motion tracker 330 is used to collect 6DOF foot-motion data in real time and wirelessly transmit it to the head-mounted VR device 130.

The head-mounted VR device 310 is used to, during the sport training, display virtual demonstrative actions, collect 6DOF head-motion data in real time, and acquire the 6DOF hand-motion data collected in real time by the hand-motion tracker 320 and the 6DOF foot-motion data collected in real time by the foot-motion tracker 330; fuse the 6DOF hand-motion data and the 6DOF foot-motion data with the 6DOF head-motion data; calculate motion data of different parts of the human body according to the data that have been fused;

and compare the motion data of the different parts of the human body obtained by the calculation with the standard sport training data, and if the degree of similarity is greater than a threshold, determine that the action of a human-body part meets a training standard, and if not, the head-mounted VR device 310 displays a corresponding prompting message in a virtual reality scene to prompt a human-body part whose action is not standard.

In an embodiment of the present application, the head-mounted VR device 310 is provided therein with a head-mounted tracking camera, an electromagnetic signal receiving module or an ultrasonic signal receiving module; and the hand-motion tracker 320 and the foot-motion tracker 330 are both provided therein with an electromagnetic sensor and an electromagnetic signal emitting module, or are both provided therein with an ultrasonic sensor and an ultrasonic signal emitting module.

The head-mounted VR device 310 is particularly used to collect the pose information of the head motion in real time by using the built-in head-mounted tracking camera.

The hand-motion tracker 320 and the foot-motion tracker 330 are particularly used to collect the pose information of the hand motion and the pose information of the foot motion in real time respectively by using the built-in electromagnetic sensors, and wirelessly transmit them to the electromagnetic signal receiving module of the head-mounted VR device 310 by using the electromagnetic signal emitting modules.

Alternatively, the hand-motion tracker 320 and the foot-motion tracker 330 collect the pose information of the hand motion and the pose information of the foot motion in real time respectively by using the built-in ultrasonic sensors, and wirelessly transmit them to the ultrasonic signal receiving module of the head-mounted VR device 310 by using the ultrasonic signal emitting modules.

In an embodiment of the present application, the head-mounted VR device 310 is further provided therein with a first wireless-communication module and a first IMU sensor, and the hand-motion tracker 320 and foot-motion tracker 330 are both further provided therein with a second wireless-communication module and a second IMU sensor.

The head-mounted VR device 310 is further particularly used to collect the IMU information of the head motion in real time by using the built-in first IMU sensor, and fuse the IMU information of the head motion with the pose information of the head motion to obtain the 6DOF head-motion data.

The hand-motion tracker 320 and the foot-motion tracker 330 are further particularly used to collect the IMU information of the hand motion and the IMU information of the foot motion in real time respectively by using the built-in second IMU sensors, and wirelessly transmit them to the first wireless-communication module of the head-mounted VR device 310 by using the second wireless-communication modules. The head-mounted VR device 310 is further used to fuse the pose information of the hand motion with the IMU information of the hand motion to obtain the 6DOF hand-motion data, and fuse the pose information of the foot motion with the IMU information of the foot motion to obtain the 6DOF foot-motion data.

In an embodiment of the present application, the head-mounted VR device 310 is particularly used to acquire a rotation matrix and a translation vector of the electromagnetic signal receiving module or ultrasonic signal receiving module relative to the first IMU sensor, perform coordinate system conversion on the 6DOF hand-motion data and the 6DOF foot-motion data by using the rotation matrix and the translation vector, and convert them into 6-DOF motion data with the first IMU sensor as the origin.

In an embodiment of the present application, before sport training, after wearing the hand-motion tracker 320, foot-motion tracker 330 and head-mounted VR device 310, the user makes corresponding actions according to the virtual calibration action displayed in the head-mounted VR device. The head-mounted VR device 310 is further used to display the virtual calibration action before sport training and acquire sport training calibration data; and calculate the motion speed and the motion angle of the different parts of the human body, the displacement information of each part, and the motion hold time of each key part of the human body according to the data that have been fused and the sport training calibration data by using an inverse kinematics algorithm.

Figure 6:
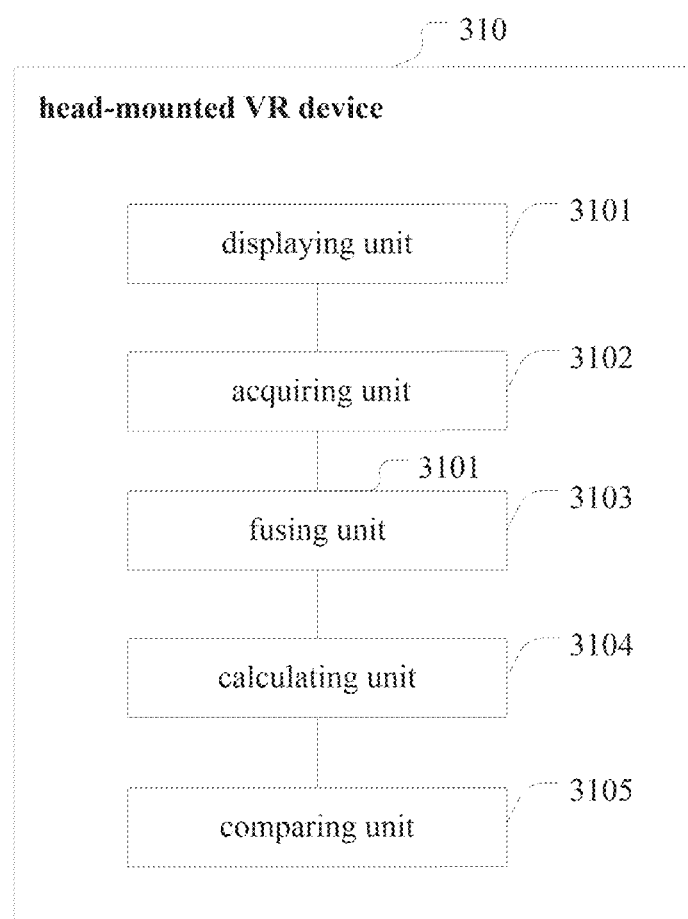
FIG. 6 is a schematic structural diagram of a head-mounted VR device according to an embodiment of the present application.

FIG. 6 is a schematic structural diagram of a head-mounted VR device according to an embodiment of the present application. As shown in FIG. 6, the head-mounted VR device 310 comprises:

a displaying unit 3101 configured for displaying a virtual demonstrative action;

an acquiring unit 3102 configured for acquiring 6DOF head-motion data, 6DOF hand-motion data and 6DOF foot-motion data of the user;

a fusing unit 3103 configured for fusing the 6DOF hand-motion data and the 6DOF foot-motion data with the 6DOF head-motion data;

a calculating unit 3104 configured for calculating motion data of different parts of a human body according to the data that have been fused; and a comparing unit 3105 configured for comparing the motion data of the different parts of the human body obtained by the calculation with standard sport training data of the virtual demonstrative action, and if a degree of similarity is greater than a threshold, determining that an action of a human-body part meets a training standard, and if not, displaying a corresponding prompting message in a virtual reality scene to prompt a human-body part whose action is not standard.

When acquiring the 6DOF head-motion data of the user, the acquiring unit 3102 is particularly configured for:

acquiring pose information of the head-mounted VR device by using a tracking camera of the head-mounted VR device;

acquiring IMU information of the head-mounted VR device by using a first IMU sensor of the head-mounted VR device; and fusing the pose information of the head-mounted VR device with the IMU information of the head-mounted VR device to obtain the 6DOF head-motion data of the user.

The hand-motion tracker and the foot-motion tracker collect the pose information of the hand motion and the pose information of the foot motion in real time respectively by using a built-in electromagnetic sensor/ultrasonic sensor, and wirelessly transmit to an electromagnetic signal receiving module/ultrasonic signal receiving module of the head-mounted VR device by using an electromagnetic signal emitting module/ultrasonic signal emitting module.

The hand-motion tracker and the foot-motion tracker also collect IMU information of the hand motion and IMU information of the foot motion in real time respectively by using a built-in second IMU sensor, and wirelessly transmit to a first wireless-communication module of the head-mounted VR device by using a second wireless-communication module.

When acquiring the 6DOF hand-motion data/6DOF foot-motion data of the user, the acquiring unit 3102 is particularly configured for:

receiving hand pose information and hand IMU information sent by the hand-motion tracker, and fusing the hand pose information and the hand IMU information to obtain the 6DOF hand-motion data;

and/or, receiving foot pose information and foot IMU information sent by the foot-motion tracker, fusing the foot pose information and the foot IMU information to obtain the 6DOF foot-motion data.

In an embodiment, the fusing unit 3103 is particularly configured for: acquiring a rotation matrix and a translation vector of a built-in electromagnetic signal receiving module or ultrasonic signal receiving module of the head-mounted VR device relative to the first IMU sensor, and performing coordinate system conversion on the 6DOF hand-motion data and the 6DOF foot-motion data by using the rotation matrix and the translation vector, to convert the 6DOF hand-motion data and the 6DOF foot-motion data into 6-DOF motion data with the first IMU sensor as an origin.

Figure 5:
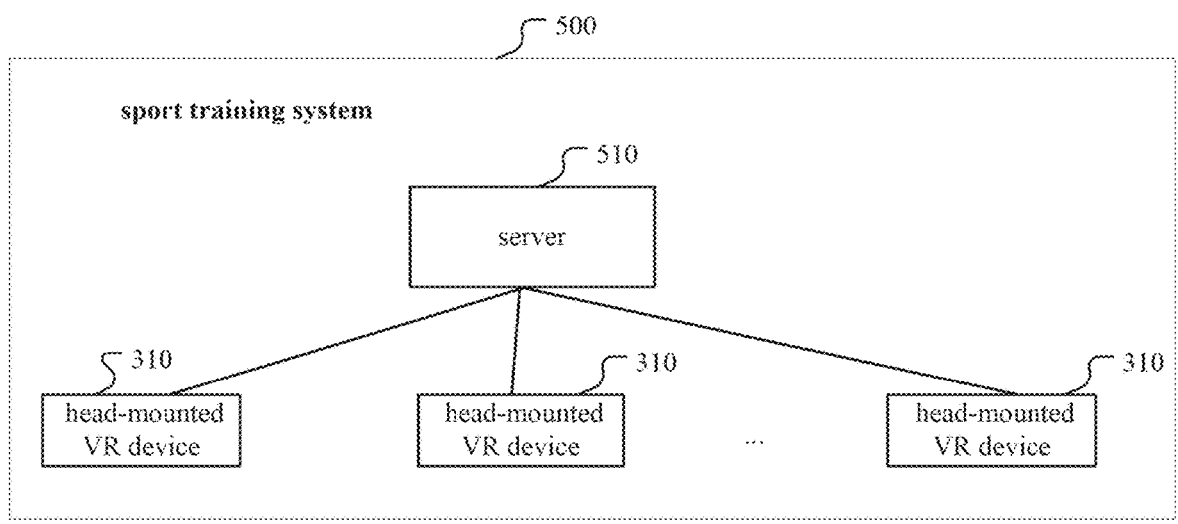
FIG. 5 is a schematic structural diagram of a sport training system according to an embodiment of the present application.

FIG. 5 is a schematic structural diagram of a sport training system according to an embodiment of the present application. As shown in FIG. 5, the sport training system 500 comprises: a server 510, and a plurality of above-mentioned head-mounted VR devices 310 connected to the server 510 via a network.

Each of the head-mounted VR devices 310 is configured for sending the motion data of different parts of the human body of its own user obtained by calculation to the server 510.

The server 510 is configured for receiving the motion data of the different parts of the human bodies of a plurality of uses sent by the plurality of head-mounted VR devices 310; in a virtual reality scene, drawing user avatars, driving the virtual user avatars in real time by using a graphics processing unit (GPU) on the received user data of each of the head-mounted VR devices, and rendering and updating to obtain a multi-person interactive motion scene; and sending the multi-person interactive motion scene to each of the head-mounted VR devices 310 in real time.

Each of the head-mounted VR devices 310 is further configured for displaying the multi-person interactive motion scene on a display screen, so as to realize remote interaction with another sport training user in the virtual reality scene.

The sport training system according to the present embodiment realizes the remote interaction among sport training users in the virtual reality scene via the server 510 and the plurality of head-mounted VR devices 310 connected to the server, so that the sport training users can interactively chat, and share fitness methods, diet precautions and other topics in the fitness process, thereby improving the interactivity and interest of fitness exercises, improving the user experience, and thus enhancing the fitness efficiency and effect.

It should be noted that the particular embodiments of the above device and system embodiments can be carried out with reference to the particular embodiments of the above corresponding process embodiments, and will not be repeated here.

In sum, the technical solutions of the present application can determine whether the user's actions are standard and whether the hold time is sufficient by using merely the hand-motion tracker, the foot-motion tracker and the head-mounted VR device, and send the feedback to the head-mounted VR device in time, and the user is not required to wear a large number of sensors, thereby improving the user experience. The cooperation of the head-mounted tracking camera, the electromagnetic sensor/ultrasonic sensor and the IMU sensor increases the tracking precision and frequency. The position offset error can reach the order of millimeters, the rotation angle offset error can be less than 1.5°, the outputted frequency is greater than 200 Hz, and high-precision high-frequency motion data can be obtained. Further, by comparing the obtained motion data with the demonstrative actions and marking the prompting message on the human-body part whose action is not standard, the non-demonstrative actions can be corrected in time, and various exercise indicators such as the quantity of wrong actions, the occurrence time of wrong actions, the average success rate of correct actions and the quantity of completed actions can be counted and fed back to the user in time, which can enable the user to understand the completion of the actions and improve the fitness efficiency and effect. Moreover, the remote interaction among sport training users can be realized by using the server, which further improves the user experience.

It should be noted that:

The algorithms and displays provided herein are not inherently relevant to any specific computer, virtual device or other devices. Various general purpose devices can also be used together with the teaching herein. According to the above description, the structures that are required to construct this type of devices are apparent. Furthermore, the present application is not limited to any specific programming language. It should be understood that the contents of the present application described herein can be implemented by using various programming languages, and the description above for a specific language is intended to disclose the most preferable embodiments of the present application.

The description provided herein describes many concrete details. However, it can be understood that the embodiments of the present application may be implemented without those concrete details. In some of the embodiments, well-known processes, structures and techniques are not described in detail, so as not to affect the understanding of the description.

Similarly, it should be understood that, in order to simplify the present application and help understanding one or more of the aspects of the present application, in the above description of the exemplary embodiments of the present application, the features of the present application are sometimes grouped into individual embodiments, figures or the descriptions thereto. However, the method that is disclosed should not be interpreted as reflecting the intention that the present application, which is claimed, requires more feature than the features that are explicitly set forth in each of the claims. More exactly, as reflected by the following claims, the aspects of the present application are less than all of the features of the individual embodiments that are disclosed above. Therefore, the claims which follow a particular embodiment are thereby explicitly incorporated into the particular embodiment, and each of the claims itself serves as an separate embodiment of the present application.

A person skilled in the art can understand that the modules in the device of an embodiment may be self-adaptively modified and be provided in one or more devices that are different from the embodiment. The modules or units or components in the embodiments may be combined into one module or unit or component, and may also be divided into multiple submodules or subunits or subcomponents. Unless at least some of such features and/or processes or units are mutually rejected, all of the features that are disclosed by the description (including the accompanying claims, the abstract and the drawings) and all of the processes or units of any method or device that is disclosed herein may be combined in any combination. Unless explicitly stated otherwise, each of the features that are disclosed by the description (including the accompanying claims, the abstract and the drawings) may be replaced by alternative features that provide the same, equivalent or similar objects.

Furthermore, a person skilled in the art can understand that, although some embodiments described herein comprise a certain features that are included in other embodiments instead of other features, the combination of the features of different embodiments means maintaining within the scope of the present disclosure and forming different embodiments. For example, in the following claims, any one of the embodiments that the present disclosure seeks to protect can be used in any combination.

Each component embodiment of the present application may be implemented by hardware, or by software modules that are operated on one or more processors, or by a combination thereof. A person skilled in the art should understand that some or all of the functions of some or all of the components of the sport training device according to the embodiments of the present application may be implemented by using a microprocessor or a digital signal processor (DSP) in practice. The present application may also be implemented as apparatus or device programs (for example, computer programs and computer program products) for implementing part of or the whole of the method described herein. Such programs for implementing the present application may be stored in a computer-readable medium, or may be in the form of one or more signals. Such signals may be downloaded from an Internet website, or provided on a carrier signal, or provided in any other forms.

It should be noted that the above embodiments are for describing the present disclosure rather than limiting the present disclosure, and a person skilled in the art may design alternative embodiments without departing from the scope of the appended claims. In the claims, any reference signs between parentheses should not be construed as limiting the claims. The word "comprise" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

What is claimed is:

1. A sport training method, performed by a head-mounted VR device wirelessly connected to a hand-motion tracker for tracking motion data of a hand of a user and a foot-motion tracker for tracking motion data of a foot of the user, wherein the method comprises:
   displaying a virtual demonstrative action;
   acquiring 6DOF head-motion data, 6DOF hand-motion data and 6DOF foot-motion data of the user, wherein acquiring the 6DOF head-motion data of the user comprises:
      acquiring pose information of the head-mounted VR device by using a tracking camera of the head-mounted VR device;
      acquiring IMU information of the head-mounted VR device by using a first IMU sensor of the head-mounted VR device; and
      fusing the pose information of the head-mounted VR device with the IMU information of the head-mounted VR device to obtain the 6DOF head-motion data of the user;
   fusing the 6DOF hand-motion data and the 6DOF foot-motion data with the 6DOF head-motion data, comprising:
   acquiring a rotation matrix and a translation vector of a built-in electromagnetic signal receiving module or ultrasonic signal receiving module of the head-mounted VR device relative to the first IMU sensor, and performing coordinate system conversion on the 6DOF hand-motion data and the 6DOF foot-motion data by using the rotation matrix and the translation vector, to convert the 6DOF hand-motion data and the 6DOF foot-motion data into 6-DOF motion data with the first IMU sensor as an origin;
   calculating motion data of different parts of a human body according to the data that have been fused; and
   comparing the motion data of the different parts of the human body obtained by the calculation with standard sport training data of the virtual demonstrative action, and if a degree of similarity is greater than a threshold, determining that an action of a human-body part meets a training standard, and if not, displaying a corresponding prompting message in a virtual reality scene to prompt a human-body part whose action is not standard.

2. The method according to claim 1, wherein
the hand-motion tracker and the foot-motion tracker collect pose information of a hand motion and pose information of a foot motion in real time respectively by using a built-in electromagnetic sensor/ultrasonic sensor, and wirelessly transmit to an electromagnetic signal receiving module/ultrasonic signal receiving module of the head-mounted VR device by using an electromagnetic signal emitting module/ultrasonic signal emitting module;
the hand-motion tracker and the foot-motion tracker also collect IMU information of the hand motion and IMU information of the foot motion in real time respectively by using a built-in second IMU sensor, and wirelessly transmit to a first wireless-communication module of the head-mounted VR device by using a second wireless-communication module;
acquiring the 6DOF hand-motion data and 6DOF foot-motion data of the user comprises at least one of:
   receiving hand pose information and hand IMU information sent by the hand-motion tracker, and fusing the hand pose information and the hand IMU information to obtain the 6DOF hand-motion data; or
   receiving foot pose information and foot IMU information sent by the foot-motion tracker, fusing the foot pose information and the foot IMU information to obtain the 6DOF foot-motion data.

3. The method according to claim 1, further comprising:
sending the motion data of the different parts of the human body obtained by the calculation to a server, so that the server, in a virtual reality scene, according to the motion data, draws a plurality of user avatars, and according to the plurality of user avatars, renders to generate a multi-person interactive motion scene; and
receiving the multi-person interactive motion scene sent by the server and displaying the multi-person interactive motion scene on a display screen, so as to realize remote interaction with another sport training user in the virtual reality scene.

4. A sport training system, comprising: a server, and a plurality of head-mounted VR devices connected to the server via a network;
   each of the head-mounted VR devices is configured for:
   displaying a virtual demonstrative action;
   acquiring 6DOF head-motion data, 6DOF hand-motion data and 6DOF foot-motion data of a user, wherein acquiring the 6DOF head-motion data of the user comprises:
   acquiring pose information of the head-mounted VR device by using a tracking camera of the head-mounted VR device;
   acquiring IMU information of the head-mounted VR device by using a first IMU sensor of the head-mounted VR device; and
   fusing the pose information of the head-mounted VR device with the IMU information of the head-mounted VR device to obtain the 6DOF head-motion data of the user;
   fusing the 6DOF hand-motion data and the 6DOF foot-motion data with the 6DOF head-motion data, comprising:
   acquiring a rotation matrix and a translation vector of a built-in electromagnetic signal receiving module or ultrasonic signal receiving module of the head-mounted VR device relative to the first IMU sensor, and performing coordinate system conversion on the 6DOF hand-motion data and the 6DOF foot-motion data by using the rotation matrix and the translation vector, to convert the 6DOF hand-motion data and the 6DOF foot-motion data into 6-DOF motion data with the first IMU sensor as an origin;
   calculating motion data of different parts of a human body according to the data that have been fused; and
   comparing the motion data of the different parts of the human body obtained by the calculation with standard sport training data of the virtual demonstrative action, and if a degree of similarity is greater than a threshold, determining that an action of a human-body part meets a training standard, and if not, displaying a corresponding prompting message in a virtual reality scene to prompt a human-body part whose action is not standard; and
   sending motion data of different parts of a human body obtained by calculation to the server;
   the server is configured for receiving the motion data of the different parts of the human body sent by the plurality of head-mounted VR devices; in a virtual reality scene, according to the motion data, drawing a plurality of user avatars, and according to the plurality of user avatars, rendering to generate a multi-person interactive motion scene; and sending the multi-person interactive motion scene to each of the head-mounted VR devices in real time; and
   each of the head-mounted VR devices is further configured for displaying the multi-person interactive motion scene on a display screen, so as to realize remote interaction with another sport training user in the virtual reality scene.

5. The sport training system according to claim 4, wherein:
   the sport training system further comprises a hand-motion tracker and a foot-motion tracker configured for:
   collecting pose information of a hand motion and pose information of a foot motion in real time respectively by using a built-in electromagnetic sensor/ultrasonic sensor, and wirelessly transmit to an electromagnetic signal receiving module/ultrasonic signal receiving module of the head-mounted VR device by using an electromagnetic signal emitting module/ultrasonic signal emitting module; and
   collecting IMU information of the hand motion and IMU information of the foot motion in real time respectively by using a built-in second IMU sensor, and wirelessly transmit to a first wireless-communication module of the head-mounted VR device by using a second wireless-communication module;
   the head-mounted VR devices is configured for:
   receiving hand pose information and hand IMU information sent by the hand-motion tracker, and fusing the hand pose information and the hand IMU information to obtain the 6DOF hand-motion data; or
   receiving foot pose information and foot IMU information sent by the foot-motion tracker, fusing the foot pose information and the foot IMU information to obtain the 6DOF foot-motion data.

6. The sport training system according to claim 4, wherein the head-mounted VR devices is configured for:
   sending the motion data of the different parts of the human body obtained by the calculation to a server, so that the server, in a virtual reality scene, according to the motion data, draws a plurality of user avatars, and according to the plurality of user avatars, renders to generate a multi-person interactive motion scene; and
   receiving the multi-person interactive motion scene sent by the server and displaying the multi-person interactive motion scene on a display screen, so as to realize remote interaction with another sport training user in the virtual reality scene.

* * * * *